UNITED STATES PATENT OFFICE.

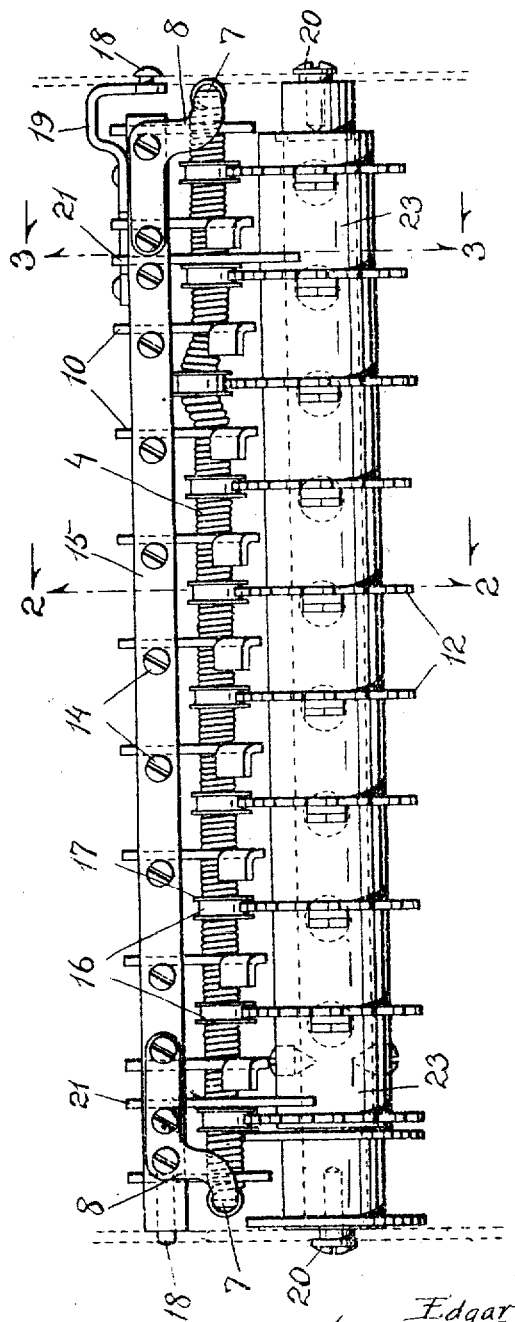

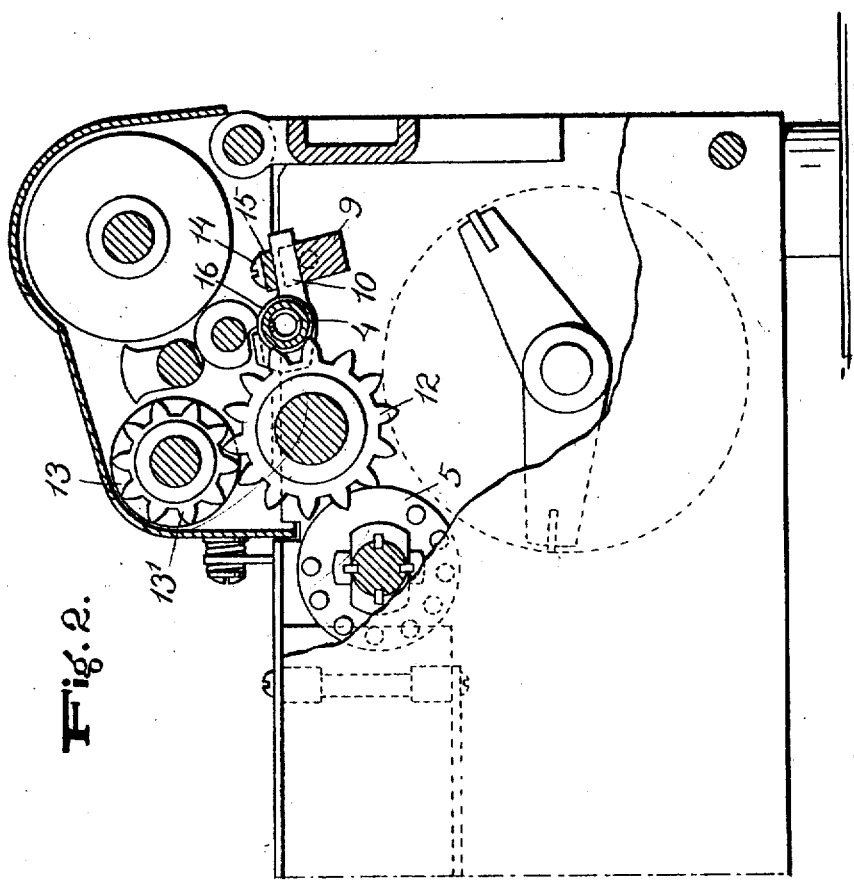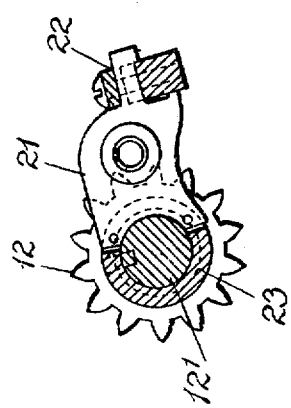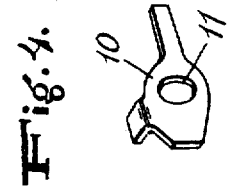

EDGAR E. PHINNEY, OF WEST ORANGE, NEW JERSEY, ASSIGNOR TO MONROE CALCULATING MACHINE COMPANY, OF ORANGE, NEW JERSEY, A CORPORATION OF NEW YORK.

OVER-ROTATION CHECK FOR CALCULATING-MACHINE GEARS.

1,349,628.     Specification of Letters Patent.     Patented Aug. 17, 1920.

Application filed July 23, 1919. Serial No. 312,788.

*To all whom it may concern:*

Be it known that I, EDGAR E. PHINNEY, a citizen of the United States, resident of West Orange, in the county of Essex and State of New Jersey, have made a certain new and useful Invention in Over-Rotation Checks for Calculating-Machine Gears; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a plan view of the invention as applied.

Fig. 2 is a vertical section of the invention as applied on the line 2—2, Fig. 1.

Fig. 3 is a detail sectional view on the line 3—3, Fig. 1.

Fig. 4 is a detail perspective view of one of the supporting fingers.

The invention has relation to calculating machines, and particularly to the provision of an improved over-rotation check whereby the operating wheels, which must rotate rapidly and freely, are held from going ahead by momentum.

The invention consists in the novel construction and combinations of parts, as hereinafter set forth.

In the accompanying drawings illustrating the invention, as applied to a machine of the type of that shown in the patent to Baldwin, of December 8, 1914, Reissue 13,841, the numeral 5 designates the selecting wheels or differential actuating wheels; 13 the dial or number wheels having attached gears 13′, and 12 the gears intermediate of said number wheels and selecting wheels.

The invention is designed as an improvement of the device of the patent of the same applicant, dated December 12, 1916, No. 1,208,366, wherein a rod located internally of a coiled spring is employed, said rod having circumferential enlargements located at intervals and affording a bearing to enable certain of the spring coils to be temporarily displaced or distorted edgewise, for the purpose stated.

4 designates the coiled spring of the present invention, located transversely of the machine and closely wound, having an eye or loop 6 at each end thereof and engaged by angularly bent extensions 7 of supporting brackets or clips 8, the latter carried by a transverse bar 9. This transverse bar is stationary, being suitably supported from the framing of the machine.

At each end and intermediately of its length between each pair of wheels 13, the coiled spring is supported by fingers 10, having perforations or circular openings 11 of about the same diameter as the external diameter of and engaged by said spring. These fingers have stems resting upon the bar 9 and clamped thereto by screws 14 and clamp bar 15.

Mounted upon the coiled spring are rollers 16, loosely engaging the spring and freely rotatable thereon, each roller having engagement with the teeth of one of the intermediate gears 12, lateral flanges 17 of the rollers preventing escape thereof from engagement with the gears, the diameter of each roller being such as to fit in between two adjacent teeth of the respective gear so as to hold the latter normally against rotation, so that when the intermediate gears are rotated by the selecting wheels they will be each yieldingly checked tooth by tooth, without any slackening of the spring pressure or check against rotation of the adjacent gear or gears.

In operation, the coils of the particular portion of the spring affected will yield and be displaced edgewise, the displacement being greatest immediately opposite the gear 12 under rotation and decreasing toward each supporting finger 10, the fingers or supports being located at the half-way point between the gears 12, and serving to localize the spring action to the particular portion of the spring allotted to each gear, it being designed that the spring check upon the adjacent gear or gears shall not be disturbed as stated.

The elastic reaction of all of the distorted coils will cause the center coil or coils immediately opposite the gear to react and engage the roller 16 with the next or succeeding teeth. The displacement of the spring coils is substantially in the planes of the coils and at right angles to the longitudinal axis of the spring, the latter being annularly or circumferentially braced and stiffened by the finger supports 10 at the midway points between the gears 12.

It is found in practice that the spring works much better or easier and with less noise and friction if it is stretched and held stretched by the aforesaid clips 8, with its coils out of contact with each other, and the spring so stretched and held in tension is also found to be more efficient, lessening the tendency to over-rotate and with a much less pressure of the rollers thereof against the gears 12. Owing to the external bracing and stiffening means or fingers the displacement of the spring coils is not limited by internal obstructions as is the case with the internal rod of the said patent.

The fingers 10 may be adjusted toward and away from the intermediate gears to vary the pressure of the spring rollers upon said gears by loosening the screws 14, and tightening them again after the desired adjustment is effected.

Preferably the transverse bar 9 is held to the framing by end screws 18, one of which engages an angular end bracket 19, of said bar, and the shaft 12' of the intermediate gears is held to the framing by end screws 20. Connecting members or plates 21, have stems 22, secured to said bar by the aforesaid clamp bar and screws 14, said plates being riveted to sleeves 23, located upon the shaft 12' of the intermediate gears between said gears, whereby upon removal of the screws 18 and 20 the transverse bar 9, the shaft 12' and its gears, and the check spring 4 may be removed as a whole or unit.

I claim:—

1. A yieldable check device adapted to prevent over-rotation of gear wheels of calculating machines, consisting of a coiled spring extending parallel to the shaft of said gear wheels, and at intervals bearing against the teeth of said wheels, and means located midway between said wheels and externally of said spring to hold certain of the coils of the spring against displacement and to localize the spring action of certain other coils of the spring with respect to said gear wheels.

2. A yieldable check device adapted to prevent over-rotation of gear wheels of calculating machines, consisting of a coiled spring extending parallel to the shaft of said gear wheels and carrying anti-friction rollers located at intervals and bearing against the teeth of said wheels, and means located midway between said wheels and externally of said spring to hold certain of the coils of the spring against displacement and to localize the spring action of certain other coils of the spring with respect to said gear wheels.

3. A yieldable check device adapted to prevent over-rotation of gear wheels of calculating machines, consisting of a coiled spring extending parallel to the shaft of said gear wheels and carrying anti-friction rollers located at intervals and bearing against the teeth of said wheels, and stiffening and bracing members located midway between said wheels and externally of said spring to hold certain of the coils of the spring against displacement and to localize the spring action of certain other coils of the spring with respect to said gear wheels.

4. A yieldable check device adapted to prevent over-rotation of gear wheels of calculating machines, consisting of a coiled spring extending parallel to the shaft of said gear wheels and at intervals through the medium of anti-friction rollers bearing against the teeth of said wheels, said spring having its coils out of contact with each other, means for holding the spring with its coils so out of contact, and means located midway between said gear wheels to hold certain of the coils of the spring against displacement and to localize the spring action of certain other coils of the spring with respect to said gear wheels.

5. A yieldable check device adapted to prevent over-rotation of gear wheels of calculating machines, consisting of a coiled spring extending parallel to the shaft of said gear wheels and at intervals bearing against the teeth of said wheels, said spring having its coils out of contact with each other, means for holding the spring with its coils so out of contact, and stiffening and bracing members located midway between said wheels and externally of said spring to hold certain of the coils of the spring against displacement and to localize the spring action of certain other coils of the spring with respect to said gear wheels.

6. A yieldable check device adapted to prevent over-rotation of gear wheels of calculating machines, consisting of a coiled spring extending parallel to the shaft of said gear wheels and at intervals bearing against the teeth of said wheels, said spring being stretched and having its coils out of contact with each other, means for holding the spring so stretched and under tension with its coils out of contact and means located midway between said gear wheels to hold certain of the coils of the spring against displacement and to localize the spring action of certain other coils of the spring with respect to said gear wheels.

7. A yieldable check device adapted to prevent over-rotation of gear wheels of calculating machines, consisting of a coiled spring extending parallel to the shaft of said gear wheels and at intervals bearing against the teeth of said wheels, said spring being stretched and having its coils out of contact with each other, means for holding the spring so stretched and under tension with its coils out of contact, and stiffening and bracing members located midway between said wheels and externally of said spring to hold certain of the coils of the spring against displacement and to localize the spring action of certain other coils of the spring with respect to said gear wheels.

In testimony whereof I affix my signature in presence of two witnesses.

EDGAR E. PHINNEY.

Witnesses:
W. P. BREEDING,
L. DAGGART.